Figure 1:
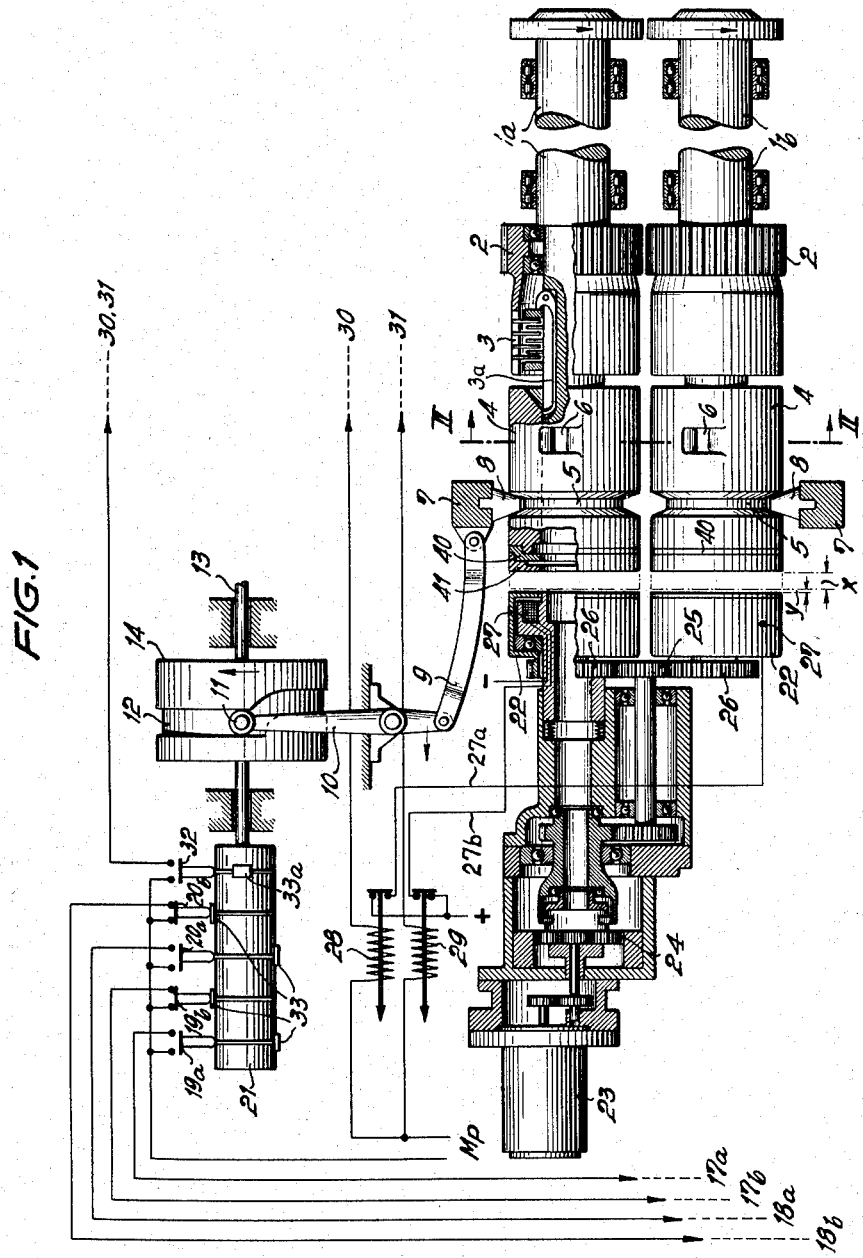

United States Patent Office 2,907,434
Patented Oct. 6, 1959

2,907,434

MEANS FOR ARRESTING THE ROTATION OF OPERATING SPINDLES OF MULTI-SPINDLE AUTOMATIC LATHES

Kurt Wenzel, Bielefeld, Germany, assignor to Werkzeugmaschinen-Fabrik Gildemeister & Comp. Akt.-Ges., Bielefeld, Germany Application December 21, 1956, Serial No. 629,881

Claims priority, application Germany December 24, 1955

5 Claims. (Cl. 192—146)

The present invention relates to machine tools such as multi-spindle automatic lathes, and in particular to means for stopping the operating spindles at a predetermined angular position thereof.

More specifically, the underlying object of the invention is to provide means enabling the operating or working spindles of a multi-spindle automatic lathe to be coupled by axially movable coupling sleeves with driving gears arranged on the spindles and to continue to run, in at least one position after the coupling has been disengaged, at a slow or idling speed, i.e., with a small number of revolutions, until a respective locking member, actuated when the slow speed operation is started, engages in a recess of the associated spindle or of the coupling sleeve axially movable on that spindle, thereby locking the same in the desired angular position.

According to the invention, the coupling sleeves of the spindles, when the latter are stationary or at a standstill, are in their rearmost end positions disposed in the field or region of action of a stationary magnet coil as well as directly adjacent a body of magnetizable material which is arranged in front of the magnet coil and which constantly rotates at a slow speed.

In addition, switching cams are arranged on a control shaft or control drum of the machine and limit switches are positioned in the range of the cams. One of these limit switches permits energization of the magnet coil by way of a switch relay when a respective operating spindle is shifted from normal to slow speed operation, while another of the limit switches, after a partial rotation of the control shaft, effects a displacement, through the intermediary of suitable hydraulic control members, such as magnetic valves, double-piston slide valves and the like, of the corresponding locking member in the direction of the spindle.

This locking or latching member, when engaging in either the coupling sleeve or the spindle at most after a full revolution of the latter, operates a switch, which disconnects the magnet coil from the source of current therefor, thus interrupting the magnetic coupling between the slow speed drive system and the particular spindle which is at a standstill.

As compared to known devices for stopping the spindles of multi-spindle automatic lathes, the device constructed according to the invention has the advantage that the braking of the spindles is completely independent of the switching operations of the spindle drum. This makes it possible to carry out a short machining operation after completion of said switching operations of the spindle drum and before the spindle is stopped for transverse machining or for charging or discharging.

Another advantage of the spindle stopping means according to the invention is that the provision of a plurality of spindle shut-off arrangements due to staggering of the cams on the control drum enables timed stopping and re-starting of the spindles independently of each other. Each stopped spindle is automatically recoupled with the drive means therefor after the indexing mechanism has been disconnected electro-hydraulically and the coupling sleeve shifted or switched by the control drum.

The device according to the present invention, therefore, renders it possible to construct, in connection with a conveyor belt or a magazine-type feed attachment, a fully automatic chucking lathe. This brings about a considerable saving of labor, since one attendant can operate several of these machines. Moreover, the unit production rate will be at an optimum value by virtue of the fact that the charging and discharging of the lathes can very easily be substantially synchronized with the working rhythm of each machine.

These and other objects and advantages of the invention will become further apparent from the following detailed description, reference being made to the accompanying drawing showing a preferred embodiment of the invention.

Figure 2:
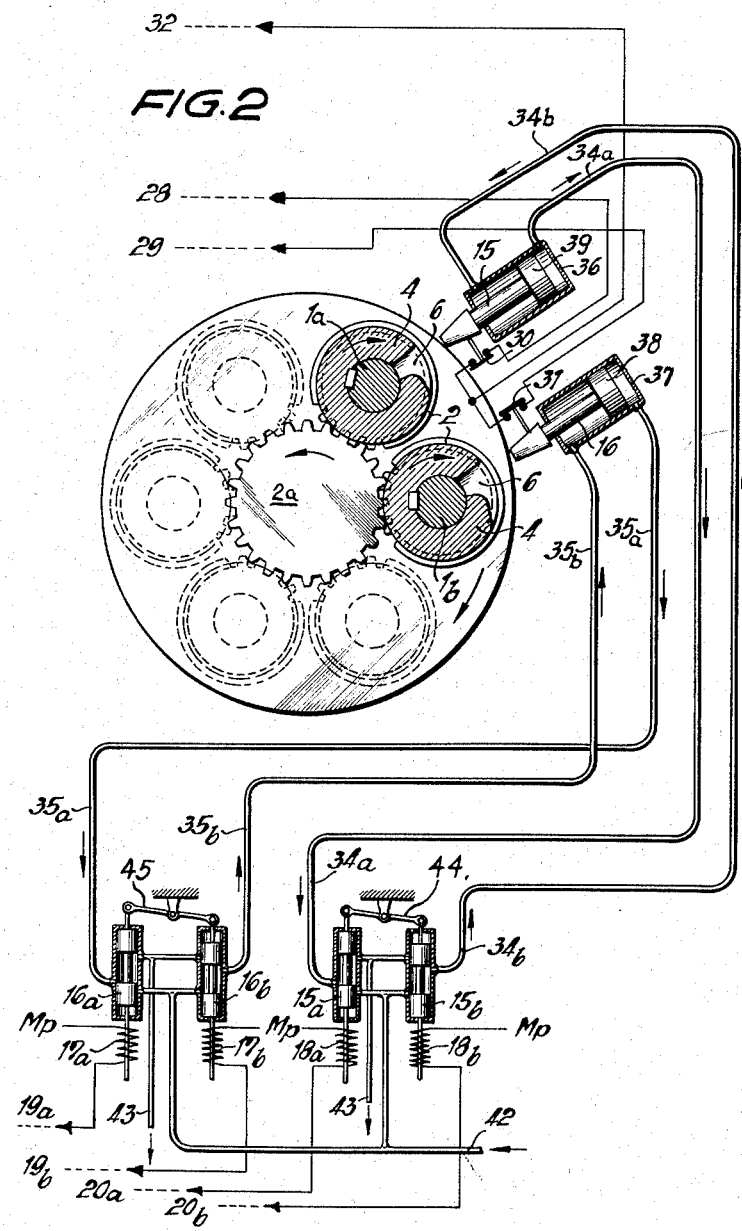

In the drawing:

Fig. 1 is a schematic and diagrammatic illustration of an embodiment of the invention as applied to a six-spindle automatic lathe and operative to stop two adjacent spindles at predetermined relative positions, and Fig. 2 is a partial cross-sectional view taken along the line II—II in Fig. 1 and schematically shows the operating system for the locking means.

Referring now more particularly to the drawing, there are shown in Fig. 1 two work spindles 1a and 1b of a six-spindle automatic lathe. Rotatably positioned on each of the circularly arranged spindles 1a, 1b, etc., is a gear 2, these gears being driven by the main drive motor of the machine via a central drive gear 2a. Each of the spindle gears 2 can be coupled with its respective spindle 1a, 1b, etc., by a plate or disc clutch 3.

Adjacent the disc clutches 3 and on the various spindles, coupling sleeves 4 are positioned in such a manner that they can be moved axially but not rotatably relative to their respective spindles. The coupling sleeves 4, when in their front end positions as shown in Fig. 1, effect engagement of the disc clutches 3 through the intermediary of angle levers 3a. An annular groove 5 and an opening 6 are provided in the periphery of each of the coupling sleeves 4.

Surrounding the group of spindles 1a, 1b, etc., is an annular frame 7 which is arranged in the region of the coupling sleeves 4 and is provided with wedge-shaped lugs or blocks 8 extending into the annular grooves 5 of the coupling sleeves 4 at the positions in which the spindles are to be brought to a standstill. The frame 7 can be displaced parallel to the operating spindles and is pivotally connected by means of a push rod or link 9 to one end of one arm of a pivotally mounted two-armed lever 10, which carries at the remote end of its other arm a roller 11 engaging in a cam groove 12 of a control drum 14 fixed to a control shaft 13 of the machine. Rotation of the control shaft 13 thus effects aixal displacement of the coupling sleeves 4 on the spindles 1a, 1b, etc.

Arranged in the region of the sleeves 4, furthermore, are latch or locking pins 15 and 16 which can be displaced radially of the spindles and are controlled electro-hydraulically, preferably by double-headed or double-piston slide valves 15a and 15b, and 16a and 16b, respectively, actuated by electromagnets 18a and 18b and 17a and 17b in whose control circuits are provided limit switches 20a and 20b and 19a and 19b, respectively. The limit switches are actuated by switch cams 33 and 33a adjustably arranged on a drum 21 fixed to the control or cam shaft 13 and engageable with pins or bolts extending from the contact elements of these limit switches.

Pressure pipes 34a, 34b, 35a and 35b lead from the slide valves 15a, 15b, 16a and 16b, respectively, to pressure cylinders 36 and 37 wherein pistons 39 and 38 carrying the locking pins 15 and 16, respectively, are arranged.

Beyond the two spindles 1a and 1b and the associated coupling sleeves are disposed rotary bodies 22 arranged to be rotated at a slow speed by a motor 23 through the intermediary of planetary gearing 24 and spur gears 25 and 26. Fixed within each body 22 is a magnet coil 27, which can be excited by direct current applied through conductors 27a and 27b from a suitable power source.

The energizing circuit for the magnet coils 27 is opened and closed by means of switch relays 28 and 29 having parallel connected "make" or working contacts. Connected in the control circuits of the switch relays 28 and 29 are limit switches 30 and 31 arranged to be actuated when the locking pins 15 and 16 are displaced longitudinally in such a manner that they are closed when the locking pins are disengaged from the recesses 6 of the coupling sleeves 4 and are open when the locking pins are engaged in said recesses. Also arranged in the common control line of the two switch relays 28 and 29 is a further limit switch 32, the operating bolt or pin of which is actuated by a switch cam 33a fixed on the drum 21.

The spindle shut-off device described above operates as follows:

When only longitudinal machining operations are carried out with the machine, i.e., when all work spindles rotate, the locking members or pins 15 and 16 are in their retracted position as shown in Fig. 2. While the locking pins are in this position, the switches 30 and 31 are closed, and the switch 32 is open. The switch relays 28 and 29 as well as the magnet coils 27 are, therefore, de-energized.

As soon as the two spindles 1a and 1b have arrived, by suitable operation of their common support or carrier, at the positions in which they are to be stopped, with their coupling sleeves 4 situated within the region of the locking pins 15 and 16 and of the magnet coils 27 of the rotating bodies 22, the blocks 8 of the frame 7 engage in the annular grooves 5 of the coupling sleeves. During subsequent rotation of the control shaft 13, the lever 10 is swung in the direction of the arrow (see Fig. 1), and the frame 7 with the blocks or projections 8 as well as the coupling sleeves 4 in the grooves 5 of which said blocks engage are displaced axially of the spindles a distance x (Fig. 1).

There exists now only a very narrow air gap y between the adjacent faces or ends of the respective coupling sleeves 4 and the slowly rotating bodies 22. The above-mentioned axial displacement of the coupling sleeves 4 toward the bodies 22 causes the disc clutches 3 to be released, thereby disconnecting the spindles 1a and 1b from the drive gears 2.

During the rotation of the control shaft 13, the switch cam 33 first strikes the operating pin of the switch 32, which closes the control circuit of the two switch relays 28 and 29, the make contacts of which, in turn, close the direct-current energization circuits of the two magnet coils 27. The magnetic fields generated thereby extend to the back portions of the coupling sleeves 4 which are thereby strongly braked but not stopped completely, and are driven by the slowly rotating bodies 22 through the forces exerted by the magnetic fields. The magnetic flux is screened from the coupling sleeves 4 by brass discs 40 which are arranged between the iron discs 41 fixed to the end faces of the coupling sleeves 4 and said end faces.

After the magnet coils 27 have been switched in, and while the shaft 13 and the drum 21 fixed thereto rotate, the switches 19a and 20a are briefly closed by the associated cams 33, whereby current impulses are fed to the control magnets 17a and 18a. These current impulses cause exertion of attractive forces on the double-headed slide valves 16a and 15a so as to shift the same from the upper position shown in Fig. 2 into the opposite lower position.

This permits the pressure fluid supplied through pipe 42 to flow by way of the valves 15a and 16a and the pipes 34a and 35a into the back portions of the cylinders 36 and 37, so that the locking pins 15 and 16 are displaced in the direction of the coupling sleeves 4. The pressure fluid present in the front portions of the two cylinders 36 and 37 is able to flow off through the pipes 34b and 35b, the slide valves 15b and 16b which, being connected to the same pivoted levers 44 and 45 as the slide valves 15a and 16a, were moved to their upper position upon energization of the magnets 18a and 17a, and the return pipes 43.

Following the axial displacement mentioned above, the locking pins 15 and 16 slide first on the peripheries of the slowly rotating coupling sleeves 4 and snap into their respective openings 6 at the latest after one full revolution of the coupling sleeves. The spindles 1a and 1b are thereby stopped in the angular position desired.

As soon as one of the two locking pins has been snapped into its recess 6, the corresponding limit switch 30 or 31 is opened. The opening of one of these two switches causes an interruption of the control circuit of the respective switch relay 28 or 29. The exciting current of the magnet coils 27, however, is fully interrupted only when the two switch relays 28 and 29 are both de-energized, i.e., when the two locking pins 15 and 16 have both been snapped into their recesses 6 and both spindles 1a and 1b have been stopped.

It is now possible, for example, to exchange the workpiece on one of the two spindles for a different workpiece and to carry out a transverse machining operation on the workpiece associated with the other spindle, such as boring a lateral hole or milling a slot.

When this operation is completed, the shaft 13 is rotated further until the switches 19b and 20b are closed by the corresponding cams 33 so as to close the energization circuits of the magnets 17b and 18b, respectively, as a result of which the double-piston slide valves 15a, 15b, 16a and 16b again occupy the positions shown in Fig. 1, whereby the locking pins 15 and 16 are again withdrawn from the recesses of the two coupling sleeves by virtue of the reversal of the flow of the pressure fluid.

After the coupling sleeves 4 have been released, the lever 10 is again pulled back into its initial position by interaction between the cam groove 12 and the roller 11 riding therein. This swinging of the lever 10, in turn, causes an axial displacement of the coupling sleeves 4 in the direction of the gears 2 so that the disc clutches 3 are engaged and the spindles 1a and 1b again coupled with the drive mechanism of the machine through gears 2 and 2a.

It can thus be seen that there has been provided according to the invention a device for use with multi-spindle automatic lathes for stopping the operating spindles thereof at predetermined angular positions, wherein spindles can be coupled, by coupling sleeves coaxially arranged on the spindles, with driving gears also coaxially arranged on the spindles, and including means operative after disengagement of the coupling sleeve to continue revolving the work spindles at a slow speed until a locking member actuated together with initiation of the slow speed operation of the spindles engages in a recess or opening in the coupling sleeves for locking the spindles in the desired angular positions.

The embodiment described above does not, of course, constitute the only form of the invention. It is, for example, possible to use the shut-off device also on machines wherein only one spindle is to be stopped at a certain angular position. It is furthermore possible to control the locking pins 15 and 16 by means other than the fluid pressure system shown.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. In an automatic lathe construction having at least one operating spindle arranged for rotation about its axis, drive gear means mounted on said spindle for rotation relative thereto, clutch means on said spindle for connecting the same to and disconnecting the same from said drive gear means, and first drive means including transmission gear means operatively connected to said drive gear means on said spindle and operable to rotate the same at a predetermined operational speed upon engagement of said clutch means; the invention comprising means for arresting said rotation of said spindle, including a coupling sleeve arranged co-axially with said spindle and carried by the same adjacent one end thereof for rotation therewith and for sliding movement axially thereof, means operable in response to movement of said coupling sleeve away from said one end of said spindle and to a first position on the latter for effecting engagement of said clutch means to connect said spindle to said drive gear means and further operable in response to movement of said coupling sleeve toward said one end of said spindle and to a second position on the latter for effecting release of said clutch means to disconnect said spindle from said drive gear means, a stationary magnet coil located adjacent said one end of said spindle, a rotary body of magnetizable material facing said one end of said spindle and located between said magnet coil and said one end of said spindle, second drive means operatively conected to said rotary body for continuously rotating the latter at a predetermined slow speed, first control means operatively connected to said coupling sleeve for normally retaining the same in said first position and for moving said coupling sleeve periodically to said second position, said coupling sleeve being provided on its periphery with catch means, locking means positioned adjacent said coupling sleeve and movable toward and away from the latter into a protracted position and a retracted position, respectively, said locking means when in said protracted position being engageable with said catch mean for preventing rotation of said coupling sleeve and said spindle, reversible operating means for selectively moving said locking means to said retracted and protracted positions thereof, a first electrical energization circuit for said magnet coil and including a first switch, a relay operable when energized to actuate said first switch and permit energization of said magnet coil, a second electrical energization circuit for said relay and including a second switch arranged to be actuated by said locking means upon movement thereof to said position, said second energization circuit further including a third switch, and second control means operated jointly with said first control means and comprising cam means operable to close said third switch periodically and in timed relation to movement of said coupling sleeve to said second position thereof by said first control means, said second control means further comprising additional cam means operable to actuate said reversible operating means in timed relation to closing of said third switch by said first-named cam means, whereby upon release of clutch means and energization of said magnet coil the magnetic field emanating from said rotary body acts on said coupling sleeve and ensures continued rotation of the latter together with said spindle subsequent to disconnection of said drive means from said spindle until movement of said locking means to said protracted position and into engagement with said catch means on said coupling sleeve is effected through actuation of said reversible operating means.

2. In a lathe construction according to claim 1; said rotation arresting means further comprising electromagnet means for actuating said reversible operating means, a third energization circuit for said electromagnet means and including additional switches actuatable by said additional cam means of said second control means.

3. In a lathe construction according to claim 1; said second drive means comprising an electric motor, and planetary gearing driven by said motor and drivingly geared to said rotary body.

4. In a lathe construction according to claim 1; said coupling sleeve being provided at its end facing said rotary body and said magnet coil with a first disc of magnetizable material and with a second disc of non-magnetizable material disposed adjacent said first disc and on the side thereof facing away from said rotary body, whereby all of said coupling sleeve except said first disc is screened from said magnetic field.

5. In an automatic lathe having at least one operating spindle arranged for rotation about its axis; a stop device comprising means for arresting said rotation of said spindle including a coupling sleeve arranged co-axially with said spindle and carried by the same adjacent one end thereof for rotation therewith and for sliding movement axially thereof, respective means operable in response to movement of said coupling sleeve away from said one end to a first position on the latter for engaging a clutch associated therewith and further operable in response to movement of said coupling sleeve toward said one end to a second position on the latter for releasing said clutch, a stationary magnet coil located adjacent said one end, a rotary body of magnetizable material facing said one end of a said spindle and enclosing said magnet coil, drive means operatively connected to said rotary body for continuously rotating the latter at a predetermined creeping speed, a first rotatable control drum provided with a peripheral cam groove, a two-armed lever having a first end riding in said cam groove and a second end operatively connected to said coupling sleeve, said cam groove being shaped to retain said coupling sleeve in said first position for a predetermined portion of rotation of said spindle and to move said coupling sleeve periodically to said second position, each coupling sleeve being provided in its periphery with a catch recess, and a locking member positioned adjacent said coupling sleeve and movable toward and away from the same into a protracted position and a retracted position, respectively, said locking member when in said protracted position extending into said catch recess to prevent rotation of said coupling sleeve and spindle.

References Cited in the file of this patent

UNITED STATES PATENTS

| | | |
|---|---|---|
| 718,212 | Lorimer | Jan. 13, 1903 |
| 878,051 | Eberhardt | Feb. 4, 1908 |
| 2,473,108 | Meyer | June 14, 1949 |
| 2,537,269 | Harding | Jan. 9, 1951 |
| 2,646,152 | Retz | July 21, 1953 |